Patented May 25, 1948

2,442,229

UNITED STATES PATENT OFFICE 2,442,229

AZEOTROPIC DISTILLATION OF CHLOROETHYL BENZENE FROM CHLOROSTYRENE

Lloyd Berg, O'Hara Township, Allegheny County, and James M. Harrison, Oakmont, Pa., assignors to Gulf Research & Development Company, Pittsburgh, Pa., a corporation of Delaware No Drawing. Application December 17, 1945, Serial No. 635,602

13 Claims. (Cl. 202—42)

This invention relates to azeotropic distillation, and more particularly to the separation of chlorostyrene from chloroethylbenzene by the addition of an entrainer to form an azeotropic system which is then distilled.

The search for plastics suitable for use in synthetic rubber formulation led to the investigation of chlorostyrene as a substitute for and an improvement over styrene in the butadiene-styrene type of synthetic rubber. However, one of the problems arising in chlorostyrene production is its separation in a high degree of purity from its precursor, chloroethylbenzene. The ordinary distillation of a chloroethylbenzene-chlorostyrene mixture does not produce a satisfactory separation in that a low yield of chlorostyrene of the desired high purity is obtained. This is to be expected in view of the proximity of the boiling points of the compounds.

It is an object of this invention, therefore, to separate, by distillation, monomeric chlorostyrene in a high degree of purity from mixtures containing chloroethylbenzene and chlorostyrene.

It is a further object of this invention to prevent the polymerization of chlorostyrene in the distillation of mixtures of chlorostyrene and chloroethylbenzene.

These and other objects are achieved by the present invention, wherein an entrainer which is a chemically inert, polar, organic oxygen-containing compound miscible with chlorostyrene and chloroethylbenzene and having a boiling point between 55° C. and 76° C. at 10 mm. Hg pressure is added to a mixture containing chloroethylbenzene and chlorostyrene to form an azeotrope with the chloroethylbenzene, and the resulting mixture is then distilled to remove the azeotrope, thereby leaving chlorostyrene substantially free from chloroethylbenzene.

The azeotrope formed by the entrainer and chloroethylbenzene has a lower boiling point than any of the other components of the charge to be distilled. Therefore, on distillation, the chloroethylbenzene azeotrope will be separated first, leaving the chlorostyrene substantially free from chloroethylbenzene.

In order to avoid the tendency of the chlorostyrene to polymerize, the following measures have been found effective, either singly or in combination. First, approximately 1 to 2 per cent of a polymerization inhibitor may be added to the charge to be distilled. Second, it is advantageous to prevent the temperature of the boiling charge from exceeding 100° C., and therefore the distillation may be conducted at a reduced pressure. Third, a high-boiling chaser may be added to the charge. The addition of a high-boiling chaser has the effect not only of reducing the formation of polymer, but also of increasing the amount of highly purified chlorostyrene in the overhead distillate after the chloroethylbenzene azeotrope has been separated. A chaser is an inert high-boiling liquid which has a boiling point considerably greater than either of the compounds to be separated. Suitable chasers are n-cetane and tetradecane.

We have found a group of organic compounds that are particularly suitable as entrainers for forming azeotropes in accordance with this invention. These compounds have the following characteristics:

(1) The compounds are polar, oxygen-containing organic compounds.

(2) The boiling points of the compounds lie between 55° C. and 76° C. at 10 mm. Hg pressure.

(3) The compounds are miscible with chlorostyrene and chloroethylbenzene.

(4) The compounds are chemically inert with respect to chlorostyrene and chloroethylbenzene.

Examples of such polar, organic oxygen-containing compounds are glycol mono butyl ether, methyl acetoacetate, n-hexanol, furfuryl alcohol, tetrahydrofurfuryl alcohol, butyric acid, diacetone alcohol, acetonyl acetone, 2-ethyl butanol, diethylaminoethanol, benzaldehyde, methyl amyl carbinol, and 2-amino-2-methyl propanol-1.

In separating chlorostyrene from chloroethylbenzene in accordance with this invention, the amount of entrainer added to the charge to be distilled is preferably adjusted so as to be approximately equal to the amount required to form an azeotrope with substantially all of the chloroethylbenzene. Less than this amount will result in an incomplete separation of chloroethylbenzene. More than this amount will result in a lower yield of substantially pure chlorostyrene in the bottoms stream. However, it should be understood that this invention is not limited to any specific amount of entrainer. While the addition of an amount of entrainer approximately equal to the amount required to form an azeotrope with substantially all of the chloroethylbenzene is preferred, variations of this amount will nevertheless result in much greater yields of substantially pure chlorostyrene than can be obtained by the straight rectification of chloroethylbenzene-chlorostyrene mixtures.

In order to determine the preferred amount of entrainer to add to the charge to be distilled, it is necessary to determine the amount of chloroethylbenzene in such charge. It is also necessary to determine the ratio of entrainer to chloroethylbenzene in the azeotrope formed by the entrainer and the chloroethylbenzene. From these two factors, the amount of entrainer to add to any mixture of chloroethylbenzene and chlorostyrene from which it is desired to separate the latter in substantially pure form may readily be calculated.

The amount of chloroethylbenzene in admixture with chlorostyrene may be determined in any convenient manner known to the art, such as by determining the refractive index of the unknown mixture and finding the composition corresponding to such refractive index from a refractive index-composition diagram constructed from data on mixtures of known composition.

In determining the ratio of entrainer to chloroethylbenzene in the azeotrope formed by the entrainer and the chloroethylbenzene, advantage is taken of the fact that the entrainers of this invention form minimum azeotropes with chloroethylbenzene; that is, the composition at which the entrainer and the chloroethylbenzene form a mixture of constant boiling point (the azeotrope) has a lower boiling point than any other mixture of the components or of the individual components separately. Accordingly, to determine the azeotrope for any given entrainer and chloroethylbenzene, it is only necessary to find the composition of the minimum boiling mixture of these components in any known manner, such as by determining the refractive index of the minimum boiling mixture and finding the composition corresponding to such refractive index from a refractive index-composition diagram constructed from data on mixtures of known composition. The boiling point of the azeotrope and its composition will vary according to the pressure at which such boiling point is determined. However, at any specified pressure, the boiling point and composition of the azeotrope are constant. The ratio of entrainer to chloroethylbenzene in the azeotrope is readily calculated after the composition of the azeotrope has been determined.

The product of (a) the ratio of entrainer to chloroethylbenzene in the azeotrope, and (b) the amount of chloroethylbenzene in admixture with chlorostyrene in the charge to be distilled, gives the amount of entrainer to add to the charge. When the amount of entrainer so calculated is added to the charge, upon distillation, an azeotrope is formed with all of the chloroethylbenzene which is distilled over first, and substantially pure chlorostyrene is left in the residue.

As set forth above, the composition of the azeotrope will vary, according to the pressure at which the boiling point of the azeotrope is determined. Any one pressure may be used for determining the composition of the azeotrope and for the subsequent distillation of the entrainer, chloroethylbenzene, chlorostyrene mixture, provided that the entrainer selected will form an azeotrope with chloroethylbenzene at such pressure. Therefore, for the distillation, an entrainer is selected which will form an azeotrope with chloroethylbenzene at the desired pressure. A representative range of pressures for the practice of this invention is from about 5 mm. Hg to about 100 mm. Hg.

The following table shows the azeotropic data for some of the entrainers of this invention:

*Azeotropic data for entrainers*

| Entrainer | Boiling Point of Entrainer, °C. | | Azeotrope with Chloroethylbenzene at 10 mm. | |
|---|---|---|---|---|
| | 760 mm. | 10 mm. | Boiling Point, °C. | Wt. Per Cent of Chloroethylbenzene |
| Glycol monobutyl ether | 171.0 | 68.5 | 62.5 | 63.0 |
| Methyl Amyl Carbinol | 160.4 | 65.4 | 61.4 | 57.0 |
| Methyl Aceto-acetate | 171.7 | 65.1 | 60.0 | 48.0 |
| n-Hexanol | 157.0 | 65.0 | 62.0 | 57.0 |
| Furfuryl Alcohol | 169.5 | 71.0 | 60.5 | 68.0 |
| Tetrahydrofurfuryl alcohol | 177.0 | 72.1 | 63.0 | 70.5 |
| Butyric Acid | 163.7 | 67.2 | 63.3 | 66.0 |
| Diacetone Alcohol | 167.9 | 61.6 | 59.0 | 42.0 |
| Benzaldehyde | 179.0 | 65.0 | 63.5 | 43.0 |
| Diethylamino-ethanol | 162.0 | 58.5 | 57.0 | 9.0 |
| Acetonyl Acetone | 191.4 | 75.4 | 66.0 | 76.0 |
| 2-Amino-2-Methyl Propanol-1 | 165.4 | | 59.0 | 54.0 |
| 2-Ethylbutanol | 148.9 | 55.6 | 54.9 | 26.0 |

The chloroethylbenzene with which the above data were determined was a mixture of isomers containing about 8.8 per cent of the ortho isomer, 45 per cent of the meta isomer, and 46.2 per cent of the para isomer, the mixture having a boiling point of 67.5° C. at 10 mm. Hg pressure. However, this invention is not limited to any specific combination of isomers, since the separation of chloroethylbenzene from chlorostyrene in accordance with this invention is applicable to any isomer of chloroethylbenzene and to any mixture of such isomers. As will be apparent to one skilled in the art, the azeotropic data for any specific isomer or combination of isomers may vary from the data set forth above because of the variation in boiling point of the different isomers and their various combinations.

A desirable feature of an entrainer is its ready separability from the azeotropic mixture, after the azeotrope has been separated from the chlorostyrene. Separation of the entrainer from its azeotrope with chloroethylbenzene permits the reuse of the latter to produce more chlorostyrene and the reuse of the entrainer to produce more azeotrope. Glycol mono butyl ether, furfuryl alcohol, tetrahydrofurfuryl alcohol, butyric acid, diacetone alcohol, methyl acetoacetate, acetonyl acetone, 2-amino-2-methyl propanol-1 and diethylaminoethanol are sufficiently water soluble to permit their separation from their azeotropes with chloroethylbenzene simply by extracting with water. The entrainer may be recovered from the water extract by distillation at a pressure at which the entrainer forms no azeotrope with water.

Alternatively, regardless of the solubility of the entrainer in water, separation of the entrainer from its azeotrope with chloroethylbenzene may be effected by a two step distillation as follows: First, the azeotrope from the original distillation is distilled at a pressure different from the original distillation and adapted to yield a bottoms stream of pure chloroethylbenzene and an overhead stream of an azeotrope of entrainer and chloroethylbenzene in which the entrainer-chloroethylbenzene ratio is higher than in the original azeotrope. For example, if the original distillation has been conducted at a reduced pressure to avoid polymerization of the chlorostyrene, the distillation of the original azeotrope may be conducted at atmospheric pressure. Second, the entrainer-rich azeotrope from the preceding distillation is then distilled at a pressure adapted to yield a bottoms stream of pure entrainer and an overhead stream of an azeotrope of chloroethylbenzene and entrainer which has a lower entrainer-chloroethylbenzene ratio than the azeotrope formed in the first distillation. For example, if atmospheric pressure has been used for the first distillation, the second distillation may be conducted at a reduced pressure. The pure entrainer is recycled for use in the original distillation for separation of chlorostyrene, and the chloroethylbenzene-rich azeotrope is recycled to the first distillation.

As another alternative, the original azeotrope of entrainer and chloroethylbenzene may be distilled at a pressure sufficiently high so that the entrainer no longer forms an azeotrope with the chloroethylbenzene, thus obviating the necessity for a second distillation.

The choice of any specific method of recovering entrainer and chloroethylbenzene in practice will depend upon economic considerations. In general, it has been found that the second alternative method described above is more economical and for that reason is more desirable.

The following examples further illustrate the invention. Unless otherwise specifically stated, all parts are by weight.

*Example 1.*—A mixture of chloroethylbenzene and chlorostyrene was found to contain 100 parts of the former and 150 parts of the latter. Based on the amount of chloroethylbenzene present, 56 parts of butyric acid were added which, upon distillation of the mixture at 10 mm. Hg pressure, formed an azeotrope with all of the chloroethylbenzene. The mixture was fractionated in a rectifying column at 10 mm. Hg pressure. The azeotropic mixture of chloroethylbenzene and butyric acid distilled over first, leaving substantially pure chlorostyrene as the residue. Upon further distillation at the same pressure 22.5 per cent of the original chlorostyrene in a purity of 95 per cent or higher was obtained in the overhead distillate and 47 per cent remained in the residue. The total amount of chlorostyrene recovered in a purity of 95 per cent or higher was 69.5 per cent. Butyric acid was recovered from its chloroethylbenzene azeotrope by the second alternative method disclosed above. The first distillation was conducted at atmospheric pressure, and the second distillation at 10 mm. Hg pressure.

*Example 2.*—A mixture of chloroethylbenzene and chlorostyrene was found to contain 41.5 parts of the former and 114 parts of the latter. Based on the amount of chloroethylbenzene, 58 parts of diacetone alcohol were added. Upon distillation of the mixture at 10 mm. Hg pressure, diacetone alcohol in this amount will form an azeotrope with all of the chloroethylbenzene in the mixture. 77 parts of n-cetane were added as a high-boiling chaser. The mixture was fractionated in a rectifying column at 10 mm. Hg pressure. The azeotropic mixture of diacetone alcohol and chloroethylbenzene distilled over first, leaving chlorostyrene behind. Subsequent distillation at the same pressure yielded 62 per cent of the original chlorostyrene in a purity of 95 per cent or higher in the overhead distillate, and 20 per cent chlorostyrene of the same purity in the residue. The total substantially pure chlorostyrene recovered was 82 per cent. The high-boiling chaser, n-cetane, had the effect of driving off most of the chlorostyrene and of reducing the formation of polymer in the residue remaining in the still.

*Example 3.*—To a mixture of 100 parts of chloroethylbenzene and 181 parts of chlorostyrene, there were added 75 parts of butyl Cellosolve, and 100 parts of n-cetane as a high-boiling chaser. The mixture was fractionated in a rectifying column at 10 mm. Hg pressure. The azeotropic mixture of chloroethylbenzene and butyl Cellosolve distilled over first, leaving chlorostyrene substantially free from chloroethylbenzene. Further distillation at the same pressure yielded 27.5 per cent of the original chlorostyrene in a purity of 95 per cent or higher in the overhead distillate and 29.5 per cent chlorostyrene of the same purity in the residue. The total substantially pure chlorostyrene recovered was 57 per cent.

*Example 4.*—To a mixture comprising 140 parts of chloroethylbenzene and 200 parts of chlorostyrene, there were added 80 parts of tetrahydrofurfuryl alcohol. The mixture was fractionated in a rectifying column at 10 mm. Hg pressure. The azeotropic mixture of chloroethylbenzene and tetrahydrofurfuryl alcohol distilled over first, leaving the chlorostyrene substantially free from chloroethylbenzene. Substantially pure chlorostyrene was recovered in the amount of 65.8 per cent of the original chlorostyrene. Tetrahydrofurfuryl alcohol was recovered from its azeotrope with chloroethylbenzene by extracting the azeotrope with water, and distilling the tetrahydrofurfuryl alcohol from the water extract at atmospheric pressure.

While the above examples show a batch process for the distillation, the advantages of an azeotropic distillation in accordance with this invention are applicable also to a continuous process. No special type of apparatus is required, the conventional batch or continuous stills being satisfactory.

For the purpose of comparing the azeotropic separation of chlorostyrene from chloroethylbenzene with the ordinary distillation of mixtures of these compounds, the following runs were made. A batch containing 160 parts of chloroethylbenzene and 240 parts of chlorostyrene were fractionated in a rectifying column at 10 mm. Hg pressure. Only 35 per cent of the original chlorostyrene was recovered from the residue with an apparent purity of 95 per cent or greater. Since the viscosity of the residue had increased considerably, the separation was probably enhanced by polymerization of the chlorostyrene, so that the value of 35 per cent may be considered a maximum. In an effort to eliminate the formation of polymer and to obtain substantially pure monomeric chlorostyrene in the overhead distillate, another batch containing 160 parts of chloroethylbenzene, 240 parts of chlorostyrene, 3 parts of 2,4-dichloro-6-nitrophenol as polymerization inhibitor, and 100 parts of n-cetane as a high boiling chaser were fractionated in a rectifying column at 10 mm. Hg pressure. Only 8.8 per cent of substantially pure chlorostyrene was obtained in the overhead distillate and 5.5 per cent remained in the residue in the still. The amount of substantially pure chlorostyrene separated was thus only 14.3 per cent. A comparison of the above runs with the examples of this invention shows the outstanding improvement obtained by the method of this invention over a straight rectification.

As has been shown, the use of high-boiling chasers, such as n-cetane and tetradecane, in accordance with this invention, permits recovery of pure chlorostyrene in the overhead distillate after all of the azeotrope has been distilled over. Furthermore, the chasers also reduce the tendency of the chlorostyrene to polymerize in the still. The use of chasers has the effect, therefore, of increasing the yield of pure monomeric chlorostyrene. The amount of chaser to add to the charge to be distilled is not critical. Approximately 1 part of chaser to 2 to 4 parts of chlorostyrene, chloroethylbenzene mixture may be used. The addition of approximately 1 to 2 percent of a polymerization inhibitor to the charge to be distilled also reduces the tendency of the chlorostyrene to polymerize. The use of 2,4-dichloro-6-nitrophenol for this purpose is preferred.

From the foregoing description, it is apparent that the azeotropic separation of this invention has many advantages over the straight rectification of chlorostyrene and chloroethylbenzene mixtures. For any given distilling column, using either a batch or continuous process of distillation, the separation of chlorostyrene from chloroethylbenzene in accordance with this invention always results in the recovery of a greater amount of purer chlorostyrene than can be obtained by straight rectification. Furthermore, compared with a straight rectification, an azeotropic separation will reduce the number of theoretical plates required in the distilling column; that is, the height of the column and/or the reflux ratio are not as great as required for a straight rectification. The ready separability of the entrainers of this invention from their azeotropes with chloroethylbenzene has the advantage of permitting recovery and reuse of both chloroethylbenzene and entrainer.

The chloroethylbenzene and chlorostyrene referred to herein have the chlorine substituted in the ring. Accordingly, the term "chloroethylbenzene" refers to any of the ortho, meta or para isomers, or to mixtures thereof; and the term "chlorostyrene" refers to any of the ortho, meta or para isomers or to mixtures thereof. This invention is applicable to any mixture of chloroethylbenzene and chlorostyrene containing any combination of such isomers.

What we claim is:

1. The process of separating chlorostyrene in which the chlorine is substituted in the benzene ring from mixtures thereof with chloroethylbenzene in which the chlorine is substituted in the benzene ring which comprises adding to a mixture of said chlorostyrene and chloroethylbenzene a member of the group consisting of glycol mono butyl ether, methyl amyl carbinol, n-hexanol, furfuryl alcohol, tetrahydrofurfuryl alcohol, diacetone alcohol, 2-ethylbutanol, 2-amino-2-methyl-1-propanol, and diethylaminoethanol to form an azeotrope with the chloroethylbenzene and then distilling the resultant mixture to remove the azeotrope thereby leaving chlorostyrene substantially free from chloroethylbenzene.

2. The process of separating chlorostyrene in which the chlorine is substituted in the benzene ring from mixtures thereof with chloroethylbenzene in which the chlorine is substituted in the benzene ring which comprises adding to a mixture of said chlorostyrene and chloroethylbenzene a member of the group consisting of glycol mono butyl ether, methyl amyl carbinol, n-hexanol, furfuryl alcohol, tetrahydrofurfuryl alcohol, diacetone alcohol, 2-ethylbutanol, 2-amino-2-methyl-1-propanol, and diethylaminoethanol in amount approximately equal to the amount required to form an azeotrope with the chloroethylbenzene and then distilling the resultant mixture to remove the azeotrope thereby leaving chlorostyrene substantially free from chloroethylbenzene.

3. The process of separating chlorostyrene in which the chlorine is substituted in the benzene ring from mixtures thereof with chloroethylbenzene in which the chlorine is substituted in the benzene ring which comprises adding to a mixture of said chlorostyrene and chloroethylbenzene a member of the group consisting of glycol mono butyl ether, methyl amyl carbinol, n-hexanol, furfuryl alcohol, tetrahydrofurfuryl alcohol, diacetone alcohol, 2-ethylbutanol, 2-amino-2-methyl-1-propanol, and diethylaminoethanol to form an azeotrope with the chloroethylbenzene, distilling the resultant mixture at a pressure of from 5 mm. Hg to about 100 mm. Hg to remove the azeotrope thereby leaving chlorostyrene substantially free from chloroethylbenzene and further distilling to recover substantially pure chlorostyrene as distillate.

4. The process of separating chlorostyrene in which the chlorine is substituted in the benzene ring from mixtures thereof with chloroethylbenzene in which the chlorine is substituted in the benzene ring which comprises adding to a mixture of said chlorostyrene and chloroethylbenzene a polymerization inhibitor and a member of the group consisting of glycol mono butyl ether, methyl amyl carbinol, n-hexanol, furfuryl alcohol, tetrahydrofurfuryl alcohol, diacetone alcohol, 2-ethylbutanol, 2-amino-2-methyl-1-propanol, and diethylaminoethanol to form an azeotrope with the chloroethylbenzene and then distilling the resultant mixture to remove the azeotrope thereby leaving chlorostyrene substantially free from chloroethylbenzene.

5. The process of separating chlorostyrene in which the chlorine is substituted in the benzene ring from mixtures thereof with chloroethylbenzene in which the chlorine is substituted in the benzene ring which comprises adding to a mixture of said chlorostyrene and chloroethylbenzene an inert liquid having a boiling point higher than chlorostyrene and chloroethylbenzene and a member of the group consisting of glycol mono butyl ether, methyl amyl carbinol, n-hexanol, furfuryl alcohol, tetrahydrofurfuryl alcohol, diacetone alcohol, 2-ethylbutanol, 2-amino-2-methyl-1-propanol, and diethylaminoethanol to form an azeotrope with the chloroethylbenzene and then distilling the resultant mixture to remove the azeotrope thereby leaving chlorostyrene substantially free from chloroethylbenzene.

6. The process of separating chlorostyrene in which the chlorine is substituted in the benzene ring from mixtures thereof with chloroethylbenzene in which the chlorine is substituted in the benzene ring which comprises adding glycol mono butyl ether to a mixture of said chlorostyrene and chloroethylbenzene to form an azeotrope with the chloroethylbenzene and then distilling the resultant mixture to remove the azeotrope thereby leaving chlorostyrene substantially free from chloroethylbenzene.

7. The process of separating chlorostyrene in which the chlorine is substituted in the benzene ring from mixtures thereof with chloroethylbenzene in which the chlorine is substituted in the benzene ring which comprises adding tetrahydrofurfuryl alcohol to a mixture of said chlorostyrene and chloroethylbenzene to form an azeotrope with the chloroethylbenzene and then distilling the resultant mixture to remove the azeotrope thereby leaving chlorostyrene substantially free from chloroethylbenzene.

8. The process of separating chlorostyrene in which the chlorine is substituted in the benzene ring from mixtures thereof with chloroethylbenzene in which the chlorine is substituted in the benzene ring which comprises adding diacetone alcohol to a mixture of said chlorostyrene and chloroethylbenzene to form an azeotrope with the chloroethylbenzene and then distilling the resultant mixture to remove the azeotrope thereby leaving chlorostyrene substantially free from cholorethylbenzene.

9. The process of separating chlorostyrene in which the chlorine is substituted in the benzene ring from mixtures thereof with chloroethylbenzene in which the chlorine is substituted in the benzene ring which comprises adding glycol mono butyl ether and an inert high boiling liquid having a boiling point higher than the said chloroethylbenzene and chlorostyrene to a mixture of said chlorostyrene and chloroethylbenzene, distilling the resultant mixture to remove the azeotrope thereby leaving chlorostyrene substantially free from chloroethylbenzene and then subjecting the undistilled residue to further distillation to separate chlorostyrene therefrom.

10. The process of separating chlorostyrene in which the chlorine is substituted in the benzene ring from mixtures thereof with chloroethylbenzene in which the chlorine is substituted in the benzene ring which comprises adding tetrahydrofurfuryl alcohol and an inert high boiling liquid having a boiling point higher than the said chlorostyrene or chloroethylbenzene to a mixture of said chlorostyrene and chloroethylbenzene, distilling the resultant mixture to remove the azeotrope thereby leaving chlorostyrene substantially free from chloroethylbenzene and then subjecting the undistilled residue to further distillation to separate chlorostyrene therefrom.

11. The process of separating chlorostyrene in which the chlorine is substituted in the benzene ring from mixtures thereof with chloroethylbenzene in which the chlorine is substituted in the benzene ring which comprises adding diacetone alcohol and an inert high boiling liquid having a boiling point higher than the said chlorostyrene or chloroethylbenzene to a mixture of said chlorostyrene and chloroethylbenzene, distilling the resultant mixture to remove the azeotrope thereby leaving chlorostyrene substantially free from chloroethylbenzene and then subjecting the undistilled residue to further distillation to separate chlorostyrene therefrom.

12. The process of separating chlorostyrene in which the chlorine is substituted in the benzene ring from a mixture thereof with chloroethylbenzene in which the chlorine is substituted in the benzene ring which comprises, adding to a mixture of said chlorostyrene and chloroethylbenzene an entrainer selected from the group consisting of glycol mono butyl ether, methyl amyl carbinol, n-hexanol, furfuryl alcohol, tetrahydrofurfuryl alcohol, diacetone alcohol, 2-ethylbutanol, 2-amino-2-methyl-1-propanol, and diethylaminoethanol to form an azeotrope with the chloroethylbenzene, distilling the resultant mixture to remove the azeotrope and leave the chlorostyrene substantially free from chloroethylbenzene and then distilling the azeotrope at a higher pressure than the pressure at which said azeotrope was originally distilled.

13. The process of separating chlorostyrene in which the chlorine is substituted in the benzene ring from a mixture thereof with chloroethylbenzene in which the chlorine is substituted in the benzene ring which comprises, adding to a mixture of said chlorostyrene and chloroethylbenzene an entrainer selected from the group consisting of glycol mono butyl ether, methyl amyl carbinol, n-hexanol, furfuryl alcohol, tetrahydrofurfuryl alcohol, diacetone alcohol, 2-ethylbutanol, 2-amino-2-methyl-1-propanol, and diethylaminoethanol to form an azeotrope with chloroethylbenzene, distilling the resultant mixture to remove the azeotrope and leave the chlorostyrene substantially free from chloroethylbenzene, extracting the azeotrope thus formed with water and distilling the water extract to recover substantially pure entrainer.

LLOYD BERG.
JAMES M. HARRISON.

REFERENCES CITED

The following references are of record in the file of this patent:

UNITED STATES PATENTS

| Number | Name | Date |
|---|---|---|
| 2,380,019 | Bloomer | July 10, 1945 |
| 2,385,235 | Schneider | Sept. 18, 1945 |
| 2,398,689 | Bloomer | Apr. 16, 1946 |
| 2,411,106 | Petry | Nov. 12, 1946 |

OTHER REFERENCES

International Critical Tables, vol. 3, pages 319 and 321. (Copy in Scientific Library.)

Lecat, Annelles des Societe Scientifique de Bruxelles, vol. 49, part 2, pages 291, 292, 313. (Copy in Library of U. S. Geological Survey, Washington, D. C.)